United States Patent

[11] 3,604,821

[72] Inventor William R. Martini
      Richland, Wash.
[21] Appl. No. 870,930
[22] Filed Aug. 13, 1969
[45] Patented Sept. 14, 1971
[73] Assignee McDonnell Douglas Corporation
      Division of Ser. No. 702,745,
      Feb. 2, 1968, Pat. No. 3,513,659.

[54] STIRLING CYCLE AMPLIFYING MACHINE
     9 Claims, 9 Drawing Figs.
[52] U.S. Cl. .................................................. 417/379,
                                    417/395, 62/6, 60/24
[51] Int. Cl. .................................................... F04b 17/00,
                                    F04b 43/06, F25j 3/02
[50] Field of Search ............................................. 60/24; 62/6;
                                    165/10; 417/379, 381, 395

[56] References Cited
     UNITED STATES PATENTS
2,907,169  10/1959  Newton .......................  60/24
3,248,870  5/1966  Morgenroth .................  60/24

Primary Examiner—Robert M. Walker
Attorneys—Walter J. Jason, Donald L. Royer and D. N. Jeu ABSTRACT: Constant volume regenerative, or Stirling, cycle thermal amplifying machine having an independently oscillated regenerator. Small amount of input energy is used to oscillate the regenerator. These oscillations produce large output pressure pulses which are adapted to drive a device, such as a pump, producing a large amount of output energy. Working fluid in machine is gas in one version wherein a bellows responsive to the pressure pulses of the gas is utilized to drive the pump, and is liquid in another version wherein the bellows can be omitted and the pressure pulses of the liquid is directly utilized to drive the pump.

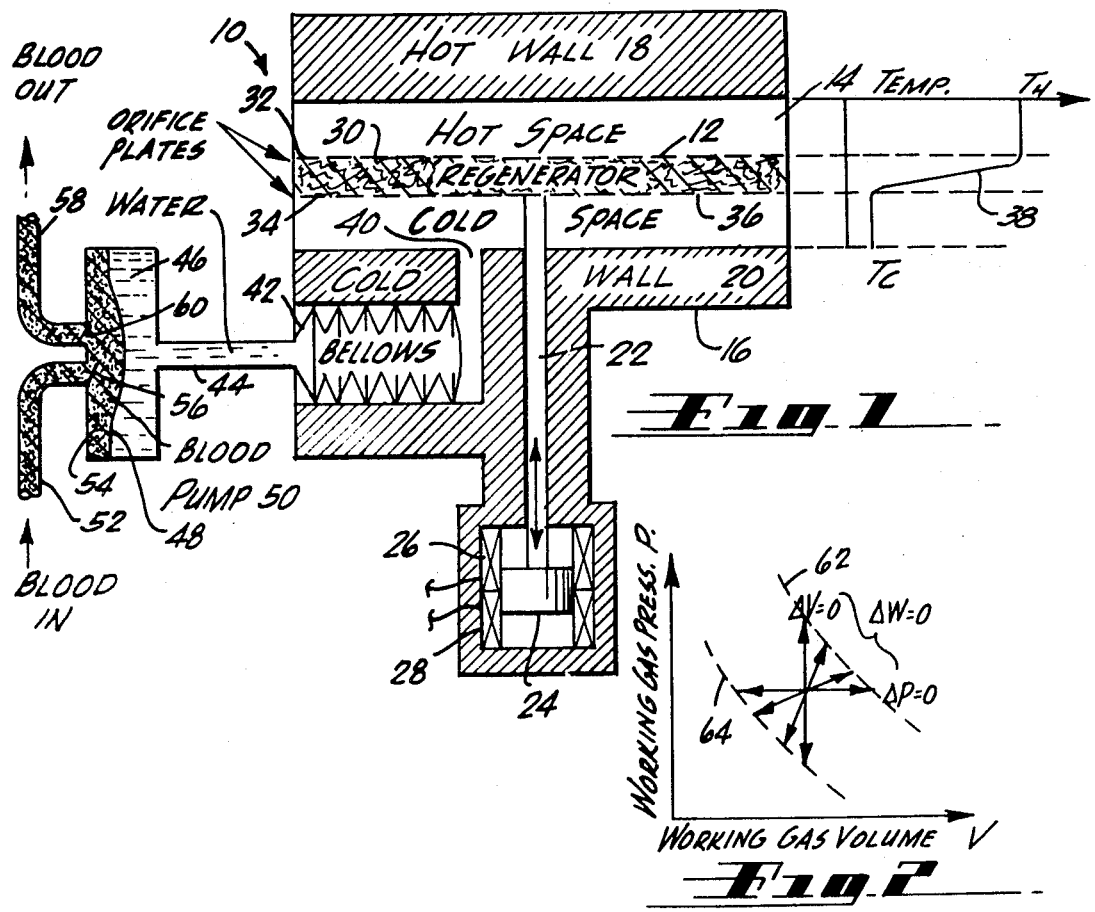
Fig. 1
Fig. 2
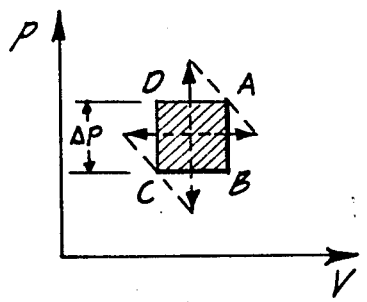
Fig. 3
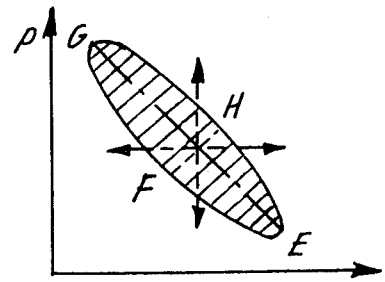
Fig. 4
INVENTOR.
WILLIAM R. MARTINI INVENTOR.
WILLIAM R. MARTINI
BY Dock N. Jen
—AGENT—

3,604,821

STIRLING CYCLE AMPLIFYING MACHINE

This is a division of application Ser. No. 702,745 filed Feb. 2, 1968, now U.S. Pat. No. 3,513,659.

CROSS-REFERENCES TO RELATED APPLICATIONS

A Stirling cycle thermal machine having a self-oscillating regenerator is shown, described and claimed in a copending U.S. Pat. application of Arthur R. Baumgardner, Richard P. Johnston, William R. Martini and Maurice A. White, Ser. No. 702,420, filed Feb. 1, 1968 for Stirling Cycle Machine With Self Oscillating Regenerator, now U.S. Pat. No. 3,484,616. A pulsatile, passive-filling (nonsucking), pump device is shown, described and claimed in a copending patent application of Richard B. Goranson and William R. Martini, Ser. No. 705,121 filed Feb. 13, 1968 for Pulsatile Heart Pump now U.S. Pat. No. 3,478,695.

BACKGROUND OF THE INVENTION

My present invention pertains generally to the field of thermal regenerative machines and more particularly to a Stirling cycle thermal amplifying machine which is useful as an efficient power source for providing output energy that is much larger than the input energy applied thereto.

The conventional thermal regenerative, Stirling cycle, machines are of the double-cylinder, two-piston type or of the single-cylinder, piston and displacer type. Each machine of either of these types of Stirling cycle machines has two working spaces filled with a working fluid and connected by a duct including fixed regenerator and heat exchangers therein. Both of these types of machines further require a crank and linkage mechanism which maintains a proper phase relationship between the two pistons of the double-cylinder type or between the piston and displacer of the single-cylinder type. This crank and linkage mechanism is comparatively complicated and has precipitated seal problems which have limited the operating lifetime of the conventional Stirling cycle machines.

The Stirling cycle is a thermodynamic cycle wherein a fluid or gas alternately undergoes constant volume and constant temperature processes and in which the heat-up and cooldown of the gas is done at constant volume by a thermal regenerator. This cycle has Carnot cycle efficiency. The Ericsson cycle is similar to the Stirling cycle except that the heat-up and cooldown of the gas is done at constant pressure by the regenerator. This cycle also has Carnot cycle efficiency.

The real engine with a mechanical linkage that places the two pistons, or the piston and displacer, in simple harmonic motion 90° out of phase with each other rounds the corners of the idealized thermodynamic cycles mentioned above. In the real engine, the heat-up and cooldown of the gas is actually done at changing volume and pressure by є regenerator. Nevertheless, if it is assumed that the regenerator is perfect and heat transfer to and from the gas is perfect, then this engine, loosely called a Stirling cycle engine, also has Carnot cycle efficiency.

The mechanical motion imposed by the design of the real Stirling engine just described is not always the most advantageous. For instance, instantaneous control of the power output of the engine could be obtained by varying either the phase angle or the amplitude of the regenerator motion. In fact, a constant phase angle is not always advantageous. For instance, in certain pumping engines the phase angle changes periodically during each cycle. Nevertheless, any or all of these engines would have perfect, Carnot cycle, efficiency if the heat transfer were perfect and if the regenerator were perfect. It is noted that when an adequately efficient regenerator is used in the Stirling cycle machine, the whole working cycle is reversible and the same machine can be an engine or refrigerator.

An engine with a 90° phase angle between two power pistons or between displacer and piston produces the most power at the highest efficiency. Losses in the mechanical linkages in the engine is a separate problem, and it is apparent that if the phase-maintaining mechanism can be eliminated from the Stirling cycle machines, a simpler and more reliable machine with an increased lifetime could be obtained. This, of course, requires a substantial change in the remaining elements or components of the conventional Stirling cycle machines including the improvision of novel structure therefor. An even simpler and greater reliability machine can be further derived if some of the machine elements or components can be deleted and their functions transferred to exterior elements or components of established of known (high) reliability and (long) life.

SUMMARY OF THE INVENTION

Briefly, and in general terms, my invention is preferably accomplished by providing a regenerator vessel forming a chamber wherein a regenerator is independently oscillated in a reciprocating motion along the central axis of the chamber between a hot and a cold surface thereof such that the volume changes therein cause a cyclic variation in pressure and the differences in mean pressure produce large output pressure pulses which can be suitably directed to means for converting such pulses into mechanical energy or motion.

The regenerator is preferably attached to the end of a rod which extends outside of the regenerator chamber and is independently reciprocated or driven by any suitable means such as an electrical motor or solenoid, clockwork, a pneumatic or hydraulic motor, or any other device which requires a relatively small amount of input energy. The regenerator is free to oscillate in its chamber utilizing a suitable working fluid which is gas in one version of the invention and liquid in another version. The regenerator may be a disc having a porous matrix of a high heat storage capacity material sandwiched between two thin orifice plates. These orifice plates have many small holes therein which cause the working fluid passing through the porous matrix to jet against the hot and cold surfaces of the regenerator chamber, to enhance and increase heat transfer between the working fluid and the hot and cold surfaces. Where the working fluid is a liquid, the regenerator and particularly its porous matrix is preferably treated to make it liquid repellent so that the machine can operate in any position.

BRIEF DESCRIPTION OF THE DRAWINGS

My invention will be more fully understood, and other features and advantages thereof will become apparent, from the following description of certain exemplary embodiments of the invention. The description is to be taken in conjunction with the accompanying drawings, in which:

FIG. 1 is a diagrammatic and somewhat simplified sectional view of a thermal regenerative machine utilizing a gaseous working fluid and having an independently oscillated regenerator for producing large output pressure pulses which are adapted to drive a pump in accordance with my invention;

FIG. 2 is a graph of pressure versus volume of the working fluid in the thermal regenerative machine, where the machine is not connected to do any useful work;

FIG. 3 is a graph of the pressure-versus-volume diagram where the thermal regenerative machine is connected to operate an ideal fluid pump;

FIG. 4 is a graph of the pressure-versus-volume diagram where the thermal regenerative machine is connected to drive a piston having a natural (system) frequency similar to the oscillated regenerator of the machine;

DESCRIPTION OF THE PRESENT EMBODIMENTS

Figure 5A:
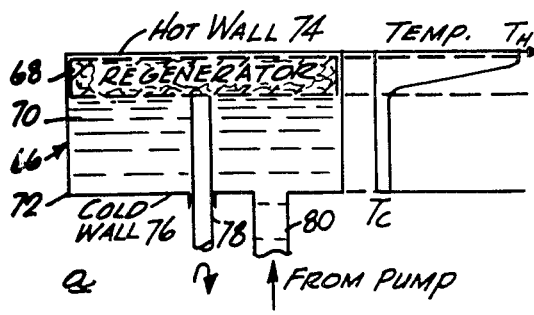
FIGS. 5A, 5B, 5C and 5D are fragmentary, diagrammatic and simplified sectional views illustrating the operation of a thermal regenerative machine utilizing an essentially liquid working fluid which also serves to transmit large pressure pulses directly to a fluid pump.

FIG. 1 is a diagrammatic and somewhat simplified sectional view of a thermal regenerative machine 10 having an independently oscillated regenerator 12 in accordance with my invention. The regenerator 12 is located in a chamber 14 of the regenerator vessel 16 which is generally symmetrical circularly about the central axis thereof. The vessel 16 has a hot wall 18 and a cold wall 20. The hot wall 18 can be continuously heated in any suitable manner, and the cold wall 20 can be continuously cooled in any suitable manner. The regenerator 12 is preferably a disc which is centrally attached to one end of a rod 22, the other end of which is attached to the electrically driven armature 24 of an electrical motor 26.

The motor 26 is, of course, exemplary of any suitable means for oscillating the regenerator 12. The motor 26 is energized by power provided on electrical leads to coils 28 and reciprocates the armature 24 and, consequently, the regenerator 12 between the hot and cold surfaces of the walls 18 and 20. Of course, the hot and cold surfaces do not necessarily have to be parallel surfaces, and can be varied according to any shape or configuration of the regenerator 12.

The regenerator 12 is preferably in the form of a circular disc which has a porous matrix 30 of a high heat storage capacity material, such as stainless-steel wool, sandwiched between two thin orifice plates 32 and 34 that are made of steel, for example. The orifice plates 32 and 34 each have many small orifice holes 36 therein which cause the working fluid passing through the porous matrix 30, as the regenerator 12 is moved, to jet against the hot and cold surfaces of the walls 18 and 20. This greatly enhances and increases the heat transfer between the working fluid and the hot and cold walls 18 and 20. The basic function of the regenerator 12 is to absorb heat from the working fluid as the regenerator 12 moves toward the hot surface of the wall 18, and to return the same heat to the working fluid a half cycle later as the regenerator 12 moves back towards the cold surface of the wall 20.

The working fluid contained in the machine 10 is helium, for example, and can be of any other appropriate gas including air, if that is suitable. The regenerator 12 maintains a thermal boundary between the hot and cold spaces in the vessel 16. This is illustrated by the curve 38 which is a plot of temperature versus distance in the graph shown to the right of the vessel chamber 14 in FIG. 1. Motion of the oscillated regenerator 12 greatly changes the relative volumes of the hot and cold spaces in the vessel chamber 14 and, consequently, the pressure transmitted through passageway 40 to bellows 42.

The bellows 42 is filled with a liquid which can be water, and is connected by tubing 44 to a chamber 46 on one side of the diaphragm 48 of pump 50. The pump 50 is illustratively indicated as a blood pump for pumping blood in the circulatory system of an animal (not shown). Tubing 52 supplies blood from the circulatory system to chamber 54 on the other side of the diaphragm 48 through an inlet check valve 56, and tubing 58 delivers pumped blood back to the circulatory system from the chamber 54 through outlet check valve 60. The large pressure pulses transmitted through passageway 40 operates the bellows 42 which, in turn, operates the pump 50. If desired, the bellows 42 and its associated water column can be eliminated so that the pressure pulses directly operate the diaphragm 48 of the pump 50.

FIG. 2 is a graph of working fluid (gas) pressure P versus working gas volume V for only the machine 10 of FIG. 1 wherein the mass of working fluid is fixed, and pressure and/or volume changes occur as the regenerator 12 oscillates. Where the working fluid is rigidly contained, large pressure pulses occur but no work is done because $\Delta V=0$, as indicated by the vertical line in the graph. Where the working fluid is not restrained, volume pulses are generated but still no work is done because $\Delta P=0$, as indicated by the horizontal line in the graph. Even where the working fluid is adapted to compress a spring, for example, the net work done is zero since the work done by the working fluid will be exactly returned; that is, $\Delta W=0$, as indicated by the ends of the lines in the graph. It can be seen that the ends of the traces or lines for $\Delta W=0$ lies on the broken lines 62 and 64 on the graph.

FIG. 3 is the pressure-versus-volume diagram for the instance in which the machine 10 (FIG. 1) is connected to drive the blood pump 50 that is assumed to be an ideal fluid pump. The PV diagram is now a closed FIG. as shown with an enclosed area equal to the work done. At point A, the outlet check valve 60 closes and the pressure drops unit at point B, the inlet check valve 56 opens. From the point B to point C, blood is drawn into the pump 50. The inlet check valve 56 closes at point C and the pressure increases to the point D before the outlet check valve 60 opens. The higher pressure liquid is discharged from the point D back to point A to repeat the cycle. The well-known condition for maximum transfer is obtained when the required $\Delta p$ pressure difference is approximately one-half that of the machine 10 along (blanked off).

FIG. 4 is a graph showing the pressure-versus-volume diagram for the case in which the machine 10 (FIG. 1) is connected to drive a piston suitably supported on a mass-spring system (not shown) having a natural frequency which is the same as that of the oscillated regenerator 12. In this instance, the volume swings and pressure swings of the working fluid would be greater than is possible with an untuned system. The PV diagram is now a line EG as shown in the graph. Where the piston diagram is magnetized and coils are positioned in proximity to it to remove power therefrom by placing an electromagnetic drag on the velocity of the piston, the FIG. then opens out to give the usual Stirling cycle PV diagram generally similar to the diagram EFGH shown in the graph.

FIGS. 5A, 5B, 5C and 5D are fragmentary, diagrammatic and simplified sectional views of a thermal regenerative machine 66 utilizing an essentially liquid working fluid. The machine 66 is similar to the machine 10 of FIG. 1, and includes a regenerator 68 which is oscillated within a chamber 70 of the regenerator vessel 72 between the interior hot and cold surfaces of a hot wall 74 and a cold wall 76. The regenerator 68 is attached to the end of a rod 78 which is independently reciprocated by an electrical actuator, by clockwork, or any other suitably means. The regenerator 68 can also be self-oscillated in the manner taught in the copending application of Arthur R. Baumgardner, Richard P. Johnston William R. Martini and Maurice A. White for Stirling Cycle Machine With Self Oscillating Regenerator, which is fully referenced above. The chamber 70 is connected by passageway 80 directly to a pump (not shown) which is similar to the pump 50 of FIG. 1. A bellows, such as the bellows 42, need not be used unless required.

The regenerator 68 is similar in structure to the regenerator 12 of FIG. 1 and separates the hot space from the cold space in chamber 70. Where the working fluid is water, the hot space is filled with superheated steam and the cold space is filled with liquid water. The regenerator 68 separates these two phases, and its porous matrix has sufficient heat capacity to cool and condense the steam passing through it during that part of the operating cycle. In the present design, the heat (storage) capacity is approximately 10 times greater than that for a light gas (helium, for example) working-fluid fill. The porous matrix of the regenerator 68 must be treated to render it water repellent if the machine 66 is to operate in any position other than vertically as shown. Otherwise, if the regenerator 68 is positioned on its side, from that illustrated in FIGS. 5A through 5D, water will run through the regenerator 68 on the lower side thereof and quench or flood out the heat source or hot wall 74. The porous matrix of the regenerator 68 in such instance is comprised of very fine and closely packed plastic (Teflon for example) coated wire screens.

Figure 5B:
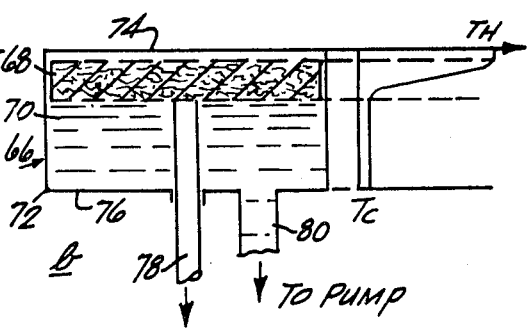
Figure 5C:
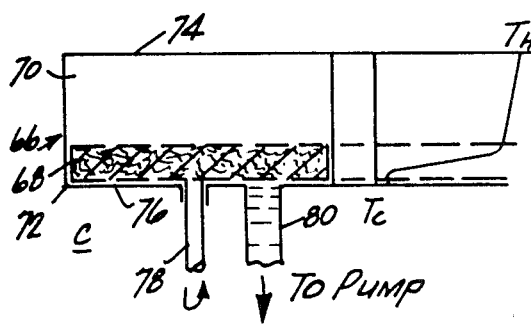
Figure 5D:
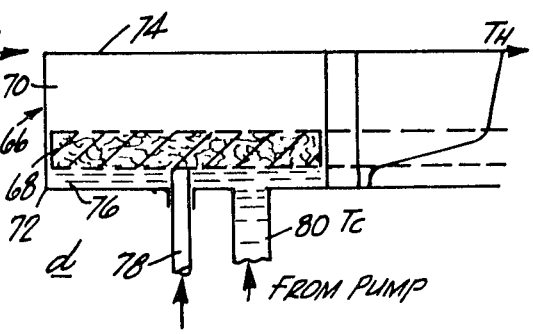
Figure 6:
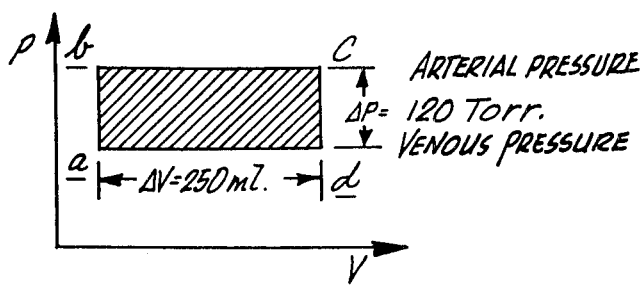
FIG. 6 is a graph showing the pressure-versus-volume diagram for the thermal regenerative machine of FIGS. 5A through 5D.

FIG. 6 is a graph showing the pressure-versus-volume diagram for the machine 66 utilizing the essentially liquid working fluid. The hatched area enclosed by the closed figure is, of course, equal to the work done. The operation of the machine 66 can be described with joint reference to this FIG. 6 and the FIGS. 5A through 5D. The operating cycle can be started at point $a$ with the regenerator 68 at the top of its stroke as shown in FIG. 5A. The water-filled cold space of chamber 70 is at its maximum volume and the porous matrix of the regenerator 68 contains maximum heat therein. The pressure is at venous pressure at the point $a$. From point $a$ to point $b$, the regenerator 68 reverse direction and moves slightly downwards as indicated from FIG 5A to FIG 5B. This action forces some water into the hotter portions of the porous matrix of the regenerator 68 and steam is formed which increases the pressure to the blood pump to arterial blood pressure. Little, if any, water flows at this time, however.

From point $b$ to point $c$ of the PV diagram of FIG. 6, the regenerator 68 continues to move downwards as indicated from FIG. 5B to FIG. 5C. During this interval, water is being expelled from the chamber 70 through the passageway 80 to actuate the connecting blood pump. But, it is to be noted, that the regenerator 68 does not physically expel the water. The regenerator 68 only controls the expulsion of the water by the continued incursion of water into its porous matrix where heating and vaporization occurs to fill the hot space of the chamber 70 with superheated steam to maintain the high pressure therein. At the time shown in FIG. 5C, all of the water has been expelled from the chamber 70, and the regenerator 68 has reversed direction and just started to move back (upwards). The outlet check valve (such as the valve 60 of FIG. 1) of the connecting blood pump is now closed.

From point $c$ to point $d$ of the diagram, the regenerator 68 has moved upwards far enough to expose some of its surface to the cold space in chamber 70 normally filled with cold water, as indicated from FIG. 5C to FIG. 5D. This allows some of the steam passing through the porous matrix of the regenerator 68 to condense and subsequently permits the pressure in chamber 70 to drop to somewhat below venous pressure at the point $d$. The inlet check valve (such as the valve 56 of FIG. 1) is now opened to draw in venous blood into the heart pump at a sufficient and proper rate. From point $d$ to point $a$, the cooling and condensation process continues. The pressure difference across the regenerator 68 is very small, and some warm water leaves the bottom of the regenerator 68 to mix with the body of water in the cold space. As can be seen from FIG. 5A, the heat of the warm water is soon dissipated in the body of cold water. One cycle of operation is now complete and the cycle again repeats itself.

It is to be noted from the foregoing description that the regenerator 68 acts to control the movement of water, and the existing arterial and venous blood pressures acting in conjunction with the outlet and inlet check valves of the blood pump control the pressure differences of the working fluid or water. Most of the mechanical (pressure) energy applied to the water is, of course, derived from the heat supplied to the machine 66 but a small fraction of such energy comes from the mechanical energy required to move the regenerator 68 and which is supplied through the connecting rod 78. This completes the description of the illustrative embodiments of my present invention.

While certain particular embodiments of my invention have been described above and shown in the accompanying drawings, it is to be understood that the described embodiments are merely illustrative of, and not restrictive on, the broad invention and that various changes in design, structure and arrangement may be made in the disclosed embodiments of my invention without departing from the true spirit of the invention.

I claim:

1. A thermal regenerative machine comprising:
   a vessel chamber including a hot wall and a cold wall, said vessel chamber having a filling of a gaseous working fluid;
   a regenerator made of material including a high heat storage capacity material and mounted in said vessel chamber;
   means for oscillating said regenerator in said vessel chamber between said hot and cold walls, said regenerator absorbing heat from said working fluid as said regenerator moves toward said hot wall and returning substantially the same heat to said working fluid as said regenerator moves back towards said cold wall;
   a passageway connecting with said vessel chamber and filled with said working fluid whereby pressure pulses can be transmitted through said passageway; and
   an output device connecting with said passageway and operated by the pressure pulses transmitted by said working fluid, said output device including a pump means for applying said pressure pulses against fluid to be acted upon.

2. A thermal regenerative machine comprising:
   a vessel chamber including a hot wall and a cold wall, said vessel chamber having a filling of a liquid working fluid;
   a regenerator made of a high heat storage capacity material and mounted in said vessel chamber;
   means for oscillating said regenerator in said vessel chamber between said hot and cold walls, said regenerator absorbing heat from said working fluid as said regenerator moves towards said hot wall and returning the same heat to said working fluid as said regenerator moves back towards said cold wall, and a change in phase of said liquid working fluid to a gaseous working fluid occuring between said regenerator from the cold wall side thereof to the hot wall side;
   an output device; and
   a passageway connecting said vessel chamber to said output device and filled with said liquid working fluid to operate said output device by pressure pulses transmitted through said passageway.

3. The invention as defined in claim 2 wherein said liquid working fluid is water, and said output device is a fluid pump.

4. The invention as defined in claim 3 wherein said fluid pump is a blood pump connected to pump blood in the circulatory system of an animal.

5. The invention as defined in claim 2 wherein
   said output device includes a fluid pump having a first pump chamber, a second pump chamber, flexible wall means separating said first and second pump chambers, an inlet check valve providing a fluid input into said first pump chamber, and an outlet check valve providing a fluid output from said first pump chamber; and
   said passageway connects said vessel chamber to said second pump chamber, said passageway and said second pump chamber being filled with said liquid working fluid.

6. The invention as defined in claim 5 wherein said liquid working fluid is water, and said fluid pump is a blood pump having said inlet and outlet check valves connected to the circulatory system of an animal to pump blood in said system.

7. A thermal regenerative machine comprising:
   a vessel chamber including a hot wall and a cold wall, said vessel chamber having a filling of a working fluid which is a gas;
   a regenerator made of material including a high heat storage capacity material and mounted in said vessel chamber;
   means for oscillating said regenerator in said vessel chamber between said hot and cold walls, said regenerator absorbing heat from said working fluid as said regenerator moves toward said hot wall and returning substantially the same heat to said working fluid as said regenerator moves back toward said cold wall;
   a passageway connecting with said vessel chamber and filled with said working fluid whereby pressure pulses can be transmitted through said passageway; and
   an output device connecting with said passageway and operated by the pressure pulses transmitted by said working fluid, said output device including a fluid pump.

8. The invention as defined in claim 7 wherein said fluid pump includes a first pump chamber, a second pump chamber, and flexible wall means separating said first and second pump chambers, and said output device further includes a variable chamber compressed operably by said transmitted pressure pulses, said second pump chamber being connected to said variable chamber and both being filled with a liquid whereby compression of said variable chamber produces a deformation of said flexible wall means and a resultant compression of said first pump chamber.

9. The invention as defined in claim 7 wherein said fluid pump is a blood pump connected to pump blood in the circulatory system of an animal.

UNITED STATES PATENT OFFICE
CERTIFICATE OF CORRECTION

Patent No. 3,604,821   Dated September 14, 1971

Inventor(s) William R. Martini

It is certified that error appears in the above-identified patent and that said Letters Patent are hereby corrected as shown below:

Column 1, line 55, the Greek letter "$\epsilon$" should read -- a --. Column 4, line 1, "$\Delta$W=0lies" should read -- $\Delta$W=0 lies --; line 6, "FIG." should read -- figure --; line 8, the word "unit" should read -- until --; line 15, "$\Delta$p" should read -- $\Delta$P --; line 26, the words "diagram is" should read -- is suitably --; line 28, "FIG." should read -- figure --; and line 40, the word "suitably" should read -- suitable --. Column 5, line 5, the word "reverse" should read -- reverses --. Column 6, line 19, "curing" should read -- curring --.

Signed and sealed this 28th day of November 1972.

(SEAL)
Attest:

EDWARD M. FLETCHER, JR.
Attesting Officer

ROBERT GOTTSCHALK
Commissioner of Patents